United States Patent
Xu et al.

(10) Patent No.: US 11,394,325 B2
(45) Date of Patent: Jul. 19, 2022

(54) MULTISTEP FINITE CONTROL SET MODEL PREDICTIVE CONTROL METHOD AND SYSTEM FOR LINEAR INDUCTION MACHINES

(71) Applicant: HUAZHONG UNIVERSITY OF SCIENCE AND TECHNOLOGY, Hubei (CN)

(72) Inventors: Wei Xu, Hubei (CN); Jianqiao Zou, Hubei (CN); Dinghao Dong, Hubei (CN); Yi Liu, Hubei (CN); Yirong Tang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 17/420,144

(22) PCT Filed: Apr. 9, 2020

(86) PCT No.: PCT/CN2020/084065
§ 371 (c)(1),
(2) Date: Jul. 1, 2021

(87) PCT Pub. No.: WO2021/142956
PCT Pub. Date: Jul. 22, 2021

(65) Prior Publication Data
US 2022/0060129 A1    Feb. 24, 2022

(30) Foreign Application Priority Data
Jan. 17, 2020    (CN) .......................... 202010055671.3

(51) Int. Cl.
*H02P 21/14* (2016.01)
*H02P 21/00* (2016.01)

(52) U.S. Cl.
CPC .......... *H02P 21/14* (2013.01); *H02P 21/0017* (2013.01)

(58) Field of Classification Search
CPC .............................. H02P 21/14; H02P 21/0017
See application file for complete search history.

(56) References Cited

U.S. PATENT DOCUMENTS

| 11,228,269 B2 * | 1/2022 | Xu | H02P 21/14 |
| 2011/0169436 A1 * | 7/2011 | Takahashi | H02P 21/20 |
| | | | 318/400.3 |
| 2015/0194918 A1 * | 7/2015 | Yamashita | B60L 3/04 |
| | | | 318/400.02 |

FOREIGN PATENT DOCUMENTS

| CN | 103715961 B | * | 2/2016 |
| CN | 106452250 | | 2/2017 |

OTHER PUBLICATIONS

Deng Jiangming et al., "A Compensated Predict Current Strategy for Single-sided Linear Induction Motors Considering Dynamical Eddy-effects and Load Vibrations", Proceedings of the CSEE, Aug. 5, 2015, submit with English abstract, pp. 3956-3963.

(Continued)

*Primary Examiner* — Bickey Dhakal
(74) *Attorney, Agent, or Firm* — JCIP Global Inc.

(57) ABSTRACT

A multistep finite control set model predictive control method for linear induction machines is provided, and the method belongs to a control technology field for linear induction machines. The method specifically includes the following steps: collecting a primary phase current of a linear induction machine in a three-phase coordinate system; solving a multistep reference voltage vector sequence by iteration according to a current value; keeping only two non-zero voltage vectors and one zero voltage vector that are closest to a reference voltage vector in each predictive step; and further eliminating a voltage vector sequence having a (Continued)

large cost function value through dynamic online comparison with a cost function value.

12 Claims, 3 Drawing Sheets

(56) References Cited

OTHER PUBLICATIONS

Jin-Woo Lee et al., "High precision control for linear motor-based container transfer system with cogging force and friction," 30th Annual Conference of IEEE Industrial Electronics Society, Nov. 2004, pp. 2992-2997.
"International Search Report (Form PCT/ISA/210) of PCT/CN2020/084065," dated Oct. 23, 2020, pp. 1-4.

* cited by examiner

MULTISTEP FINITE CONTROL SET MODEL PREDICTIVE CONTROL METHOD AND SYSTEM FOR LINEAR INDUCTION MACHINES

CROSS-REFERENCE TO RELATED APPLICATION

This application is a 371 of international application of PCT application serial no. PCT/CN2020/084065, filed on Apr. 9, 2020, which claims the priority benefits of China Patent Application No. 202010055671.3, filed on Jan. 17, 2020. The entirety of each of the above mentioned patent applications is hereby incorporated by reference herein and made a part of this specification.

BACKGROUND

Technical Field

The disclosure relates to a control technology field for linear induction machines, and in particular, relates to a multistep finite control set model predictive control method and system.

Description of Related Art

The electromagnetic structure of linear induction machines is derived from the rotary induction machines. In such a structure, the circular stator is sectioned and flattened along the radial direction and then becomes a straight line, so that linear motion is generated without the need for an intermediate transmission conversion device. However, because the structure at both ends of the linear machine is open, an end effect is generated, and the flux linkage may attenuate when the machine is running at a high speed, so it is difficult for the machine to generate high thrust at a high speed.

Since the linear machine parameters change drastically, the linear machine parameters may change with the operating conditions of the machine. Conventional control strategies include, for example, the vector control and direct thrust control strategy, but these strategies do not take into account the changes of machine parameters, so it is difficult to obtain a good control result. The model predictive control algorithm may be combined with the linear induction machine equivalent circuit model previously proposed by scholars, and the impact on parameter changes brought about by the end effect is fully considered, such that the operating performance of the machine is further improved.

In high-power applications, a linear induction machine driving system, such as a linear subway, has a low switching frequency, usually only a few hundred hertz. In order to obtain a smaller current distortion coefficient under a low switching frequency, a multistep finite control set model predictive control method may be adopted. By changing the step, the relationship between switching frequency and current quality is optimized. However, an increase in the number of predictive steps may increase the number of candidate voltage vector sequences exponentially, making the calculation of the algorithm more cumbersome. Therefore, it is necessary to find a simplified method that may reduce the amount of calculation of the multistep predictive control algorithm, so that the algorithm may be truly used in an actual control system.

SUMMARY

According to the above technical defects and requirements for improvements found in the related art, the disclosure provides a multistep finite control set model predictive control method for linear induction machines capable of compensating for an influence brought by an end effect, reasonably arranging a voltage vector switching sequence within a prediction range, and obtaining a small current distortion coefficient at a low switching frequency.

To accomplish the foregoing purposes, the following technical solutions are adopted by the disclosure.

A multistep finite control set model predictive control method for linear induction machines, comprising following steps:

(1) collecting and converting a primary phase current $i_p^k$ of a linear induction machine in a three-phase coordinate system to an αβ coordinate system to obtain a current vector value $I_1^k$ at kth time step of present;

(2) predicting a current vector value $I_1^{k+1}$ at (k+1)th time step according to the current vector value $I_1^k$ at the kth time step;

(3) calculating a reference voltage vector $$U^*_{(N+1-i)(k+i)} = \frac{V^*_{k+i} + \lambda V_1^{k+i-1} + k_1 V_{k+i}^1 + \ldots + k_{N-i} V_{k+i}^{N-i}}{1 + \lambda + k_1 + \ldots + k_{N-i}}$$

at the (k+i)th time step by iteration by treating the current vector value $I_1^{k+1}$ as an initial value, wherein predictive time i=1, L, and N, and N is a total predictive step number, $$V^*_{k+i} = \left(\frac{L_r^2 R_1 + R_2 L_m^2}{L_r^2} - \frac{L_r L_s - L_m^2}{L_r T_s}\right) I_1^{k+i} + \frac{L_r L_s - L_m^2}{L_r T_s} I_1^* - \frac{R_2 L_m}{L_r^2} \psi_2 + j\frac{L_m}{L_r} \omega_2 \psi_2,$$

wherein $V_1^{k+i-1}$ is a voltage vector selected at (k+i−1)th time step, $$V_{k+i}^h = \frac{K_{hI} I_1^{k+i} + K_{hG} G_{k+1} + K_{hL} L_\psi^{k+1}}{K_{hV}},$$

h=1, L, N−i, λ is a weighting factor, $$k_1 = \frac{\lambda(1-B)^2}{1+\lambda}, k_2 = \frac{k_1(1+\lambda)}{1+\lambda+k_1} K_{2V}^2,$$

$$k_h = \frac{k_{h-1}(1+\lambda+k_1+\ldots+k_{h-2})}{1+\lambda+k_1+\ldots+k_{h-1}} K_{hV}^2,$$

$$L_\psi^k = \frac{L_r T_s}{(L_r L_s - L_m^2)}\left(\frac{R_2 L_m}{L_r^2}\psi_2 - j\frac{L_m}{L_r}\omega_2\psi_2\right),$$

$G_{k+1} = aL^{k+1}_\psi + bI^*_1 + D^{k+1}_\psi$, a and b are coefficients, $$a = \frac{L_r^2 R_1 + R_2 L_m^2}{L_r^2} - \frac{L_r L_s - L_m^2}{L_r T_s}, b = \frac{L_r L_s - L_m^2}{L_r T_s},$$

and $$D_\psi^{k+1} = \frac{R_2 L_m}{L_r^2}\psi_2 + j\frac{L_m}{L_r}\omega_2\psi_2;$$

$T_s$ is a sampling period, $I^*_1$ is a reference current command, j represents an imaginary part, R represents resistance, ψ represents flux linkage of the linear induction machine, subscripts 1 and 2 respectively represent a primary variable and a secondary variable of the linear induction machine, $\omega_2$ represents a secondary angular velocity, $L_l$ represents leakage inductance of the linear induction machine; $L_r$ is secondary inductance, $L_s$ is primary inductance, and $L_m$ is mutual inductance.

In addition, the method further comprises the following steps:

(4) equally dividing output voltage range of an inverter into six sectors designated as first to sixth sectors in a counter-clockwise direction, determining the sectors to which reference voltage vectors at time $V_{k+}$, L, $V_{k+N}$ belong one by one, and converting a reference voltage vector angle of each sector to a first sector;

(5) performing filtering and sorting to obtain an inverter candidate output voltage sequence $$S_n^{k+i} = \begin{cases} \{V_n, V_{n+1}, V_0\} & X > 0, Y > 0 \\ \{V_n, V_{n-1}, V_0\} & X > 0, Y < 0 \\ \{V_0, V_n, V_{n+1}\} & X < 0, Y > 0 \\ \{V_0, V_n, V_{n-1}\} & X < 0, Y < 0 \end{cases}$$

according to a reference voltage vector $\overline{U}^*_{(N+1-i)(k+i)}$ converted into the first sector, wherein $X = \text{Re}(\overline{U}^*_{(*N+1-i)(k+i)}) - V_{dc}/3$, $Y = \text{Im}(\overline{U}^*_{(N+1-i)(k+i)})$, $V_{dc}$ is a direct-current bus voltage, $V_0$ is a zero voltage vector outputted by an inverter, and $V_n$, $V_{n+1}$, $V_{n-1}$ are non-zero voltage vectors outputted by the inverter;

(6) searching for an optimal voltage vector sequence from the inverter candidate output voltage sequence $S_n^{k+i}$ by treating minimizing a cost function value as a goal.

Moreover, the reference voltage vector angle of each sector is converted to the first sector through an angle conversion formula, and the angle conversion formula is:

$$T = \begin{bmatrix} \cos\left(\frac{(n-1)\pi}{3}\right) & \sin\left(\frac{(n-1)\pi}{3}\right) \\ -\sin\left(\frac{(n-1)\pi}{3}\right) & \cos\left(\frac{(n-1)\pi}{3}\right) \end{bmatrix}$$

wherein n is a serial number of the sector to which the reference voltage vector belongs.

Further, the cost function value is represented as:

$$J_N = \sum_{i=1}^{N} K_i \|S_n^{k+i} - U^*_{(N+1-i)(k+i)}\|^2,$$

wherein:

$$\begin{cases} K_1 = 1 + \lambda + k_1 + \ldots + k_{N-1} \\ \ldots \\ K_{N-1} = 1 + \lambda + k_1 \\ K_N = 1 + \lambda \end{cases},$$

and $U^{*(N+1-i)(k+i)}$ represents the reference voltage vector at the (k+i)th time step.

In general, the above technical solutions provided by the disclosure have the following beneficial effects compared with the related art.

1. In the disclosure, the multistep finite control set model predictive control method is adopted and is combined with the machine equivalent circuit model, and in this way, the influence brought by the end effect is compensated, the voltage vector switching sequence is reasonably arranged within the prediction range, and a small current distortion coefficient is obtained at a low switching frequency.

2. Further, in the disclosure, the multistep finite control set model predictive control algorithm is simplified, and by determining the sector of each reference voltage vector in the reference voltage sequence, the filtered voltage vector sequence may be obtained. In order to avoid analyzing the possible situations of other sectors, the reference voltage vector may be converted to the first sector to lower the hardware costs required by the algorithm, so that the algorithm may be widely applied in an actual driving control system.

3. In the disclosure, in order to further reduce the number of the candidate voltage vector sequences, the voltage vector sequences away from the reference voltage vector sequence may be eliminated in advance. In each predictive step, only two non-zero voltage vectors and one zero voltage vector that are closest to the reference voltage vector are kept. That is, only 3 voltage vectors are evaluated in each predictive step, and in the last predictive step, only the voltage vector closest to the reference voltage vector is required to be selected to minimize the cost function. After irrelevant voltage vector sequences are excluded, the number of voltage vectors that need to be evaluated is reduced to $N \times 3^{N-1}$.

To sum up, in the disclosure, the multistep finite control set model predictive control method is applied to the linear induction machines to improve the operating performance of the linear induction machines, especially in applications of low switching frequency. In order to lower the amount of calculation to be performed by the algorithm, the control method is simplified, and the hardware costs required for execution of the method are reduced, so that the method may be applied in an actual system.

DESCRIPTION OF THE EMBODIMENTS

To better illustrate the goal, technical solutions, and advantages of the disclosure, the following embodiments accompanied with drawings are provided so that the disclosure are further described in detail. It should be understood that the specific embodiments described herein serve to explain the disclosure merely and are not used to limit the disclosure. In addition, the technical features involved in the various embodiments of the disclosure described below can be combined with each other as long as the technical features do not conflict with each other.

I. Establishing Mathematical Model of Linear Induction Machine in αβ Coordinate System In order to compensate for an end effect produced by a linear induction machine during operation, an end effect impact factor is introduced:

$$Q = \frac{DR_2}{v(L_{l2} + L_m)} \tag{1}$$

where D is a primary length of the machine, v is a linear speed of the machine, $R_2$ is secondary resistance of the machine, $L_{l2}$ is secondary inductance of the machine, and $L_m$ is mutual inductance when the machine is stationary.

Figure 1:
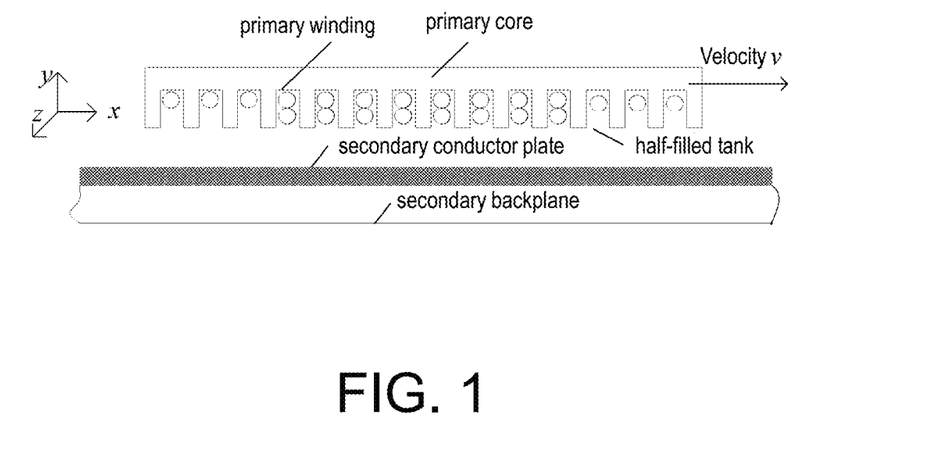
FIG. 1 is a circuit diagram of a structure of a linear induction machine.

According to a circuit diagram of a structure of the linear induction machine in FIG. 1, a machine voltage formula may be obtained as follows:

$$\begin{cases} u_{\alpha 1} = R_1 i_{\alpha 1} + \dfrac{d\psi_{\alpha 1}}{dt} \\ u_{\beta 1} = R_1 i_{\beta 1} + \dfrac{d\psi_{\beta 1}}{dt} \\ 0 = R_2 i_{\alpha 2} + \dfrac{d\psi_{\alpha 2}}{dt} + \omega_2 \psi_{\beta 2} \\ 0 = R_2 i_{\beta 2} + \dfrac{d\psi_{\beta 2}}{dt} - \omega_2 \psi_{\alpha 2} \end{cases} \tag{2}$$

a flux linkage formula of the machine is:

$$\begin{cases} \psi_{\alpha 1} = L_{l1} i_{\alpha 1} + L_m[1 - f(Q)](i_{\alpha 1} + i_{\alpha 2}) \\ \psi_{\beta 1} = L_{l1} i_{\beta 1} + L_m[1 - f(Q)](i_{\beta 1} + i_{\beta 2}) \\ \psi_{\alpha 2} = L_{l2} i_{\alpha 2} + L_m[1 - f(Q)](i_{\alpha 1} + i_{\alpha 2}) \\ \psi_{\beta 2} = L_{l2} i_{\beta 2} + L_m[1 - f(Q)](i_{\beta 1} + i_{\beta 2}) \end{cases} \tag{3}$$

where subscripts 1 and 2 respectively represent a primary variable and a secondary variable of the machine, subscripts α and β respectively represent variables of an α axis and a β axis of the machine, $\omega_2$ represents a secondary angular velocity, u represents a voltage, i represents a current, R represents resistance, ψ represents flux linkage of the machine, $L_l$ represents leakage inductance of the machine, and $$f(Q) = \frac{1 - e^{-Q}}{Q}.$$

A state variable $[i_{\alpha 1}, i_{\beta 1}, \psi_{\alpha 2}, \psi_{\beta 2}]$ is selected, the machine voltage formula is combined with the flux linkage formula, and the following may be obtained:

$$\begin{cases} \dfrac{di_{\alpha 1}}{dt} = \dfrac{u_{\alpha 1}}{\left(L_s - \dfrac{L_m^2}{L_r}\right)} - \dfrac{\left(R_1 + \dfrac{R_2 L_m^2}{L_r^2}\right)}{\left(L_s - \dfrac{L_m^2}{L_r}\right)} i_{\alpha 1} + \dfrac{\dfrac{R_2 L_m}{L_r^2}}{\left(L_s - \dfrac{L_m^2}{L_r}\right)} \psi_{\alpha 2} + \dfrac{\dfrac{L_m}{L_r}}{\left(L_s - \dfrac{L_m^2}{L_r}\right)} \omega_2 \psi_{\beta 2} \\ \dfrac{di_{\beta 1}}{dt} = \dfrac{u_{\beta 1}}{\left(L_s - \dfrac{L_m^2}{L_r}\right)} - \dfrac{\left(R_1 + \dfrac{R_2 L_m^2}{L_r^2}\right)}{\left(L_s - \dfrac{L_m^2}{L_r}\right)} i_{\beta 1} + \dfrac{\dfrac{R_2 L_m}{L_r^2}}{\left(L_s - \dfrac{L_m^2}{L_r}\right)} \psi_{\beta 2} - \dfrac{\dfrac{L_m}{L_r}}{\left(L_s - \dfrac{L_m^2}{L_r}\right)} \omega_2 \psi_{\alpha 2} \\ \dfrac{d\psi_{\alpha 2}}{dt} = \dfrac{R_2 L_m}{L_r} i_{\alpha 1} - \dfrac{R_2}{L_r} \psi_{\alpha 2} - \omega_2 \psi_{\beta 2} \\ \dfrac{d\psi_{\beta 2}}{dt} = \omega_2 \psi_{\alpha 2} + \dfrac{R_2 L_m}{L_r} i_{\beta 1} - \dfrac{R_2}{L_r} \psi_{\beta 2} \end{cases} \tag{4}$$

where $L_r = L_{l2} + L_m[1 - f(Q)]$, $L_s = L_{l1} + L_m[1 - f(Q)]$, and $L_m = L_m[1 - f(Q)]$.

Further, formula (4) is expressed as a vector form, which may be expressed as:

$$\begin{cases} \dfrac{dI_1}{dt} = \dfrac{L_r}{(L_r L_s - L_m^2)} \left(V_1 - \left(R_1 + \dfrac{R_2 L_m^2}{L_r^2}\right) I_1 + \dfrac{R_2 L_m}{L_r^2} \psi_2 - j \dfrac{L_m}{L_r} \omega_2 \psi_2\right) \\ \dfrac{d\psi_2}{dt} = \dfrac{R_2 L_m}{L_r} I_1 - \dfrac{R_2}{L_r} \psi_2 + j\omega_2 \psi_2 \end{cases} \tag{5}$$

where $I_1 = i_{\alpha 1} + j i_{\beta 1}$, $V_1 = u_{\alpha 1} + j u_{\beta 1}$, and $\psi_2 = \psi_{\alpha 2} + j \psi_{\beta 2}$.

A first-order Euler discretization method is applied, discretization is performed to formula (5), and the following may be obtained:

$$I_1^{k+1} = \left(1 - \dfrac{T_s(L_r^2 R_1 + R_2 L_m^2)}{(L_r^2 L_s - L_r L_m^2)}\right) I_1^k + \tag{6}$$

$$\dfrac{L_r T_s}{(L_r L_s - L_m^2)} \left(V_1^k + \dfrac{R_2 L_m}{L_r^2} \psi_2^k - j \dfrac{L_m}{L_r} \omega_2 \psi_2^k\right) \Rightarrow$$

$$I_1^{k+1} = M I_1^k + H V_1^k + L_\psi^k,$$

where $T_s$ is a sampling period.

II. Simplification of Single-Step Finite Control Set Model Predictive Control Method At kth time step of present, it is necessary to sample the current at this time. In order to compensate for control delay caused by calculation, formula (6) needs to be adopted to predict and obtain a predicted current at (k+1)th time step to compensate for the calculation delay. A cost function may be expressed as:

$$J = \|I^*_1 - I_1^{k+2}\|^2 + k_{sw} \|V_1^{k+1} - V_1^k\|^2 \tag{7}$$

where $I^*_1$ is a reference value of a current vector, and $k_{sw}$ is a weighting factor configured for balancing a current tracking error and a switching frequency penalty term.

For a two-level inverter, in a conventional search method, seven different voltage vectors are required to be brought into formula (6) for prediction, and the obtained predicted values are brought into formula (7) for evaluation. The voltage vector with a smallest cost function value is selected as an optimal voltage vector. It thus can be seen that this search method requires much calculation time to solve an optimal control amount.

In order to simplify an amount of calculation in the case of single-step prediction, formula (6) is incorporated into formula (7), and the cost function may be rewritten as:

$$J = \left(\frac{L_r T_s}{(L_r L_s - L_m^2)}\right)^2 J_1 \Rightarrow J_1 = \tag{8}$$

$$\|V_1^{k+1} - V_{k+1}^*\|^2 + \frac{k_{sw}(L_r L_s - L_m^2)^2}{(L_r T_s)^2}\|V_1^{k+1} - V_1^k\|^2 \Rightarrow J_1 =$$

$$\|V_1^{k+1} - V_{k+1}^*\|^2 + \lambda\|V_1^{k+1} - V_1^k\|^2 \Rightarrow J_1 =$$

$$(1+\lambda)\left\|V_1^{k+1} - \frac{V_{k+1}^* + \lambda V_1^k}{1+\lambda}\right\|^2 + Z_{k+1}^1,$$

where:

$$V_{k+1}^* = \tag{9}$$

$$\left(\frac{L_r^2 R_1 + R_2 L_m^2}{L_r^2} - \frac{L_r L_s - L_m^2}{L_r T_s}\right)I_1^{k+1} + \frac{L_r L_s - L_m^2}{L_r T_s}I_1^* - \frac{R_2 L_m}{L_r^2}\psi_2^{k+1} +$$

$$j\frac{L_m}{L_r}\omega_2\psi_2^{k+1} \Rightarrow V_{k+1}^* = aI_1^{k+1} + bI_1^* + D_\psi^{k+1}$$

$$Z_{k+1}^1 = \frac{\lambda}{1+\lambda}\|V_{k+1}^* - V_1^k\|^2. \tag{10}$$

Since $Z_{k+1}^1$ is a constant term that changes with time, it does not change with different candidate voltage vectors. As such, the cost function may be simplified as:

$$J_1' = \left\|V_1^{k+1} - \frac{V_{k+1}^* + \lambda V_1^k}{1+\lambda}\right\|^2 = \|V_1^{k+1} - U_{1(k+1)}^*\|^2. \tag{11}$$

Figure 2:
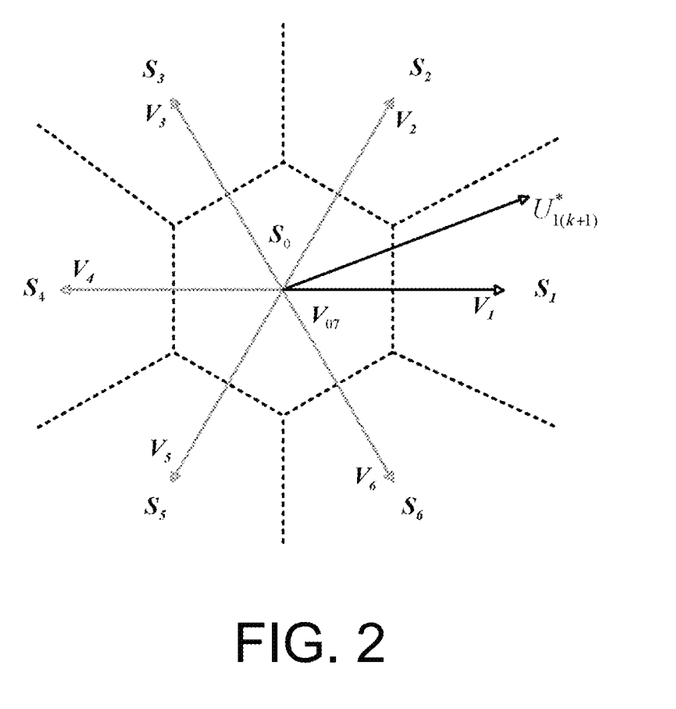
FIG. 2 depicts sector division regions in a single-step finite control set model predictive control method.

According to formula ($1_1$), it can be known that the optimal voltage vector that minimizes the cost function value is the closest to a reference voltage vector $U^*_{1(k+1)}$. Therefore, in order to facilitate comparison of the distance between the two, sector division may be performed as shown in FIG. 2. By determining the sector to which a reference voltage belongs, the candidate voltage vector of the same sector is selected as the optimal voltage vector.

III. Simplification of Multistep Finite Control Set Model Predictive Control Method When the predictive step of the finite control set model predictive control algorithm is further increased, a voltage vector sequence needs to be optimized at this time instead of a single voltage vector. Therefore, when the predicted step is N steps, for a two-level inverter, a number of the candidate voltage vectors that need to be evaluated and compared increases from the original 7 to $N \times 7^N$. The number of the candidate voltage vectors increases exponentially, resulting in a heavy calculation for the multistep predictive control algorithm. It is thus necessary to reduce the number of the candidate voltage vectors to further reduce the online calculation of the algorithm.

When the predictive step is N steps, the cost function expression of the multistep finite control set model predictive control algorithm may be written according to formula (8), which may be expressed as:

$$J_N = \sum_{i=1}^{N}\|V_1^{k+i} - V_{k+i}^*\|^2 + \lambda\sum_{i=1}^{N}\|V_1^{k+i} - V_1^{k+i-1}\|^2. \tag{12}$$

For the sake of simplicity, it is assumed that the secondary flux linkage and angular velocity remain unchanged within the predicted step, and the current vector reference value also remains unchanged, that is: $I^*_{k+2}=I^*_{k+1}=I^*_1$. At this time, by incorporating formula (6) into formula (9), a recurrence expression between the reference voltage vectors under different predictive steps may be obtained and may be expressed as:

$$V^*_{k+2} = aI_1^{k+2} + bI^*_1 + D^{k+1}_\psi$$

$$\Rightarrow V^*_{k+2} = a(MI_1^{k+1} + HV_1^{k+1} + L_\psi^{k+1}) + bI^*_1 + D^{k+1}_\psi$$

$$\Rightarrow V^*_{k+2} = AI_1^{k+1} + BV_1^{k+1} + G_{k+1}. \tag{13}$$

In order to further simplify formula (12), the following formula is derived and is expressed as:

$$l_1\|V - V_1\|^2 + \ldots + l_n\|V - V_n\|^2 = \tag{14}$$

$$(l_1 + \ldots + l_n)\left\|V - \frac{l_1 V_1 + \ldots + l_n V_n}{l_1 + \ldots + l_n}\right\|^2 +$$

$$\frac{l_n(l_1 + \ldots + l_{n-1})}{l_1 + \ldots + l_n}\left\|\frac{l_1 V_1 + \ldots + l_{n-1} V_{n-1}}{l_1 + \ldots + l_{n-1}} - V_n\right\|^2 +$$

$$\ldots + \frac{l_1 l_2}{l_1 + l_2}\|V_1 - V_2\|^2.$$

Through repeatedly using formulas (6), (13), and (14) by iteration, formula (12) may be rewritten as:

$$J_N = \sum_{i=1}^{N} K_i \|V_1^{k+i} - U^*_{(N+1-i)(k+i)}\|^2 + Z_{k+1}^N. \tag{15}$$

The recurrence relation expression of the variables in the above formula is:

$$\begin{cases} K_1 = 1 + \lambda + k_1 + \ldots + k_{N-1} \\ \ldots \\ K_{N-1} = 1 + \lambda + k_1 \\ K_N = 1 + \lambda \end{cases} \tag{16}$$

-continued $$Z_{k+1}^1 = \frac{\lambda}{1+\lambda}\|V_{k+1}^* - V_1^k\|^2 \qquad (17)$$

$$Z_{k+1}^2 = \frac{\lambda}{1+\lambda}\|V_{k+1}^* - V_1^k\|^2 + \frac{k_1(1+\lambda)}{1+\lambda+k_1}\left\|\frac{V_{k+1}^* + \lambda V_1^k}{1+\lambda} - V_{k+1}^1\right\|^2$$

$$Z_{k+1}^N = Z_{k+1}^2 + \sum_{i=2}^{N-1}\frac{k_i(1+\lambda+k_1+\ldots k_{i-1})}{1+\lambda+k_1+\ldots k_i}\|U_{i(k+1)}^* - V_{k+1}^i\|^2 \quad (N \geq 3),$$

$$k_1 = \frac{\lambda(1-B)^2}{1+\lambda},\, k_2 = \frac{k_1(1+\lambda)}{1+\lambda+k_1}K_{2V}^2, \qquad (18)$$

$$k_i = \frac{k_{i-1}1(1+\lambda+k_1+\ldots+k_{i-2})}{1+\lambda+k_1+\ldots+k_{i-1}}K_{iV}^2\,(i \geq 3),$$

$$U_{1(k+1)}^* = \frac{V_{k+1}^* + \lambda V_1^k}{1+\lambda} \qquad (19)$$

$$U_{2(k+1)}^* = \frac{V_{k+1}^* + \lambda V_1^k + k_1 V_{k+1}^1}{1+\lambda+k_1}$$

$$U_{(N+1-i)(k+i)}^* = \frac{V_{k+i}^* + \lambda V_1^{k+i-1} + k_1 V_{k+i}^1 + \ldots + k_{N-i}V_{k+1}^{N-i}}{1+\lambda+k_1+\ldots+k_{N-i}} \quad (N+1-i \geq 3),$$

$$V_{k+i}^h = \frac{K_{hI}I_1^{k+i} + K_{hG}G_{k+1} + K_{hL}L_\psi^{k+1}}{K_{hV}}, \qquad (20)$$

$$\begin{cases} K_{1V} = 1-B \\ K_{2V} = \frac{K_{1I}H}{K_{1V}} - \frac{B+\lambda}{1+\lambda} \\ \ldots \\ K_{hV} = \frac{K_{(h-1)I}H}{K_{(h-1)V}} - \frac{B+\lambda}{1+\lambda+k_1+\ldots+k_{h-2}} - \sum_{i=1}^{h-2}\frac{K_{iI}H}{K_{iV}}\frac{k_i}{1+\lambda+k_1\ldots+k_{h-2}} \end{cases}, \qquad (21)$$

$$\begin{cases} K_{1I} = A \\ K_{2I} = \frac{A}{1+\lambda} - \frac{K_{1I}M}{K_{1V}} \\ \ldots \\ K_{hI} = \frac{A}{1+\lambda+k_1+\ldots+k_{h-2}} - \frac{K_{(h-1)I}M}{K_{(h-1)V}} + \sum_{i=1}^{h-2}\frac{K_{iI}M}{K_{iV}}\frac{k_i}{1+\lambda+k_1+\ldots+k_{h-2}} \end{cases}, \qquad (22)$$

$$\begin{cases} K_{1G} = 1 \\ K_{2G} = \frac{1}{1+\lambda} - \frac{K_{1G}}{K_{1V}} \\ \ldots \\ K_{hG} = \frac{1}{1+\lambda+k_1+\ldots+k_{h-2}} - \frac{K_{(h-1)G}}{K_{(h-1)V}} + \sum_{i=1}^{h-2}\frac{K_{iG}}{K_{iV}}\frac{k_i}{k_1+\ldots+k_{n-2}} \end{cases}, \text{ and} \qquad (23)$$

$$\begin{cases} K_{1L} = 0 \\ K_{2L} = -\frac{K_{1I}+K_{1L}}{K_{1V}} \\ \ldots \\ K_{hL} = \sum_{i=1}^{h-2}\frac{K_{iI}+K_{iL}}{K_{iV}}\frac{k_i}{1+\lambda+k_1+\ldots+k_{h-2}} - \frac{K_{(h-1)I}+K_{(h-1)L}}{K_{(h-1)V}} \end{cases}. \qquad (24)$$

Since $Z_{k+1}^N$ only changes with time, the value does not change when a different voltage vector sequence is applied. Therefore, the cost function value is only related to the first term, that is, the distance between the candidate voltage vector sequence ($V_1^{k+1}, \ldots, V_1^{k+N}$) and the reference voltage vector sequence ($U^*_{N(k+1)}, \ldots, U^*_{1(k+N)}$). The cost function may be simplified as:

$$J_N = \sum_{i=1}^{N}K_i\|V_1^{k+i} - U^*_{(N+1-i)(k+i)}\|^2 + Z_{k+1}^N. \qquad (25)$$

Figure 3:
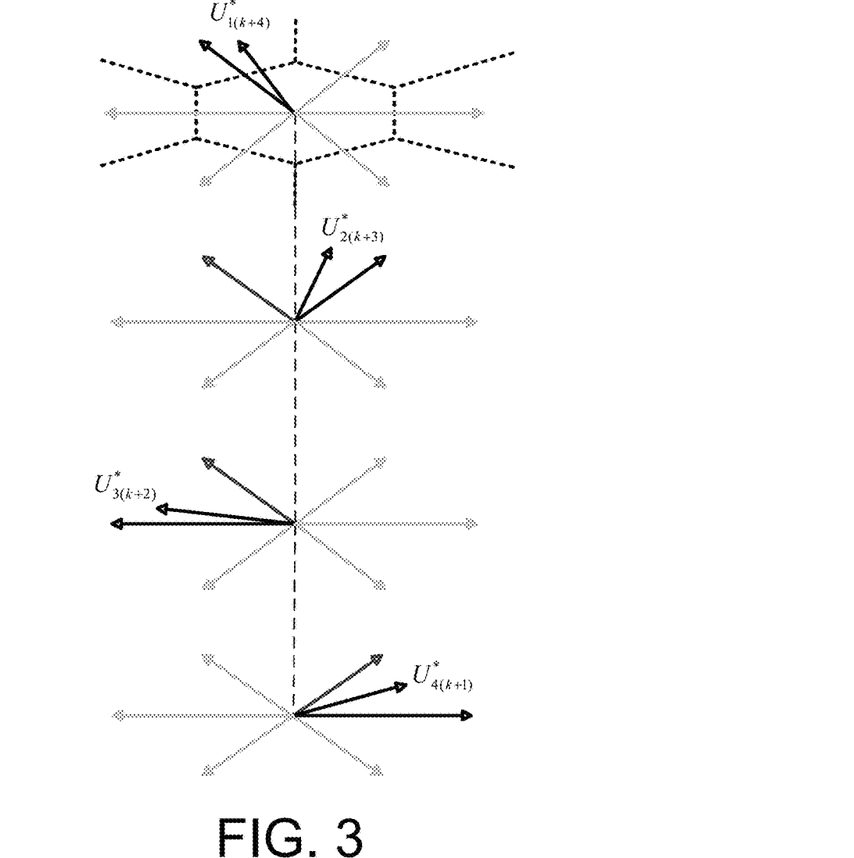
FIG. 3 is a process of selecting a voltage vector through multistep finite control set model predictive control.

In order to further reduce a number of the candidate voltage vector sequences, the voltage vector sequences away from the reference voltage vector sequence may be eliminated in advance. As shown in FIG. 3, in each predictive step, only two non-zero voltage vectors and one zero voltage vector that are closest to the reference voltage vector are kept. That is, only 3 voltage vectors are evaluated in each predictive step, and in the last predictive step, only the voltage vector closest to the reference voltage vector is required to be selected to minimize the cost function. After irrelevant voltage vector sequences are excluded, a number of voltage vectors that need to be evaluated is reduced to $N \times 3^{N-1}$.

Figure 4:
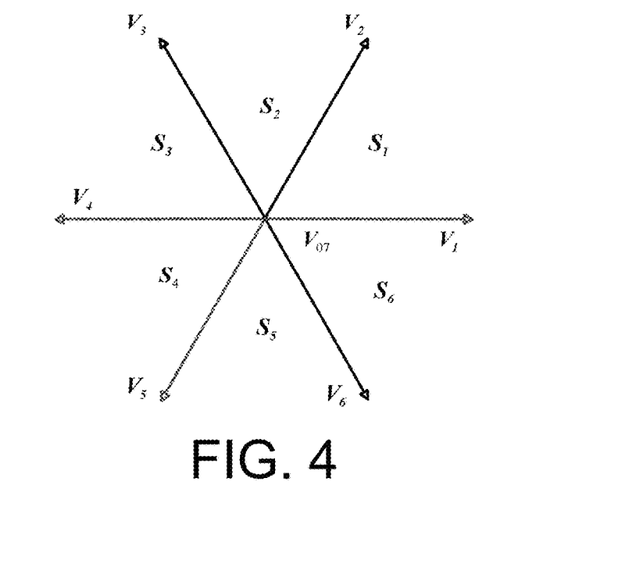
FIG. 4 depicts sector division regions in a multistep finite control set model predictive control method.

By determining the sector of each reference voltage vector in the reference voltage sequence, the filtered voltage vector sequence may be obtained, and the sector division is shown in FIG. 4. In order to avoid analyzing the possible situations of other sectors, the reference voltage vector may be converted to a first sector by the following formula, the expression is:

$$T = \begin{bmatrix} \cos\left(\frac{(n-1)\pi}{3}\right) & \sin\left(\frac{(n-1)\pi}{3}\right) \\ -\sin\left(\frac{(n-1)\pi}{3}\right) & \cos\left(\frac{(n-1)\pi}{3}\right) \end{bmatrix}, \quad (26)$$

where n is the sector of the reference voltage vector.

Through the reference voltage vector $\overline{U}^*_{(N+1-i)(k+i)}$ processed by formula (26), the 3 voltage vectors that are filtered out may be further sorted as follows:

$$S_n^{k+l} = \begin{cases} \{V_n, V_{n+1}, V_0\} & X > 0, Y > 0 \\ \{V_n, V_{n-1}, V_0\} & X > 0, Y < 0 \\ \{V_0, V_n, V_{n+1}\} & X < 0, Y > 0 \\ \{V_0, V_n, V_{n-1}\} & X < 0, Y < 0 \end{cases}, \quad (27)$$

where $X = \text{Re}(\overline{U}^*_{(N+1-i)(k+i)}) - V_{dc}/3$, $Y = \text{Im}(\overline{U}^*_{(N+1-i)(k+i)})$ and $V_{dc}$ is a direct-current bus voltage. If n=1, $V_{n-1}$ is $V_6$ and if n=6, $V_{n+1}$ is $V_1$.

Therefore, in the last predictive step, only the first voltage vector in equation (27), i.e., $S_N(1)$, is required to be selected. Nevertheless, in other predictive steps, it is necessary to compare and evaluate each voltage vector according to the sorting sequence of formula (27), i.e., $S_i(1,2,3)$. Evaluation in this order may make the cost function value small at the beginning, and the probability of becoming the optimal voltage vector sequence is greater because the later the cost function value is searched, the probability of becoming the optimal voltage vector sequence is lower. Based on the above, in each predictive step, the calculated cost function value is compared with the current optimal cost function value. If it is greater than the optimal value, this voltage vector sequence may be discarded and the next voltage vector sequence is selected for evaluation. Through such processing, some voltage vectors may be dynamically removed online, and the amount of calculation is further reduced.

Figure 5:
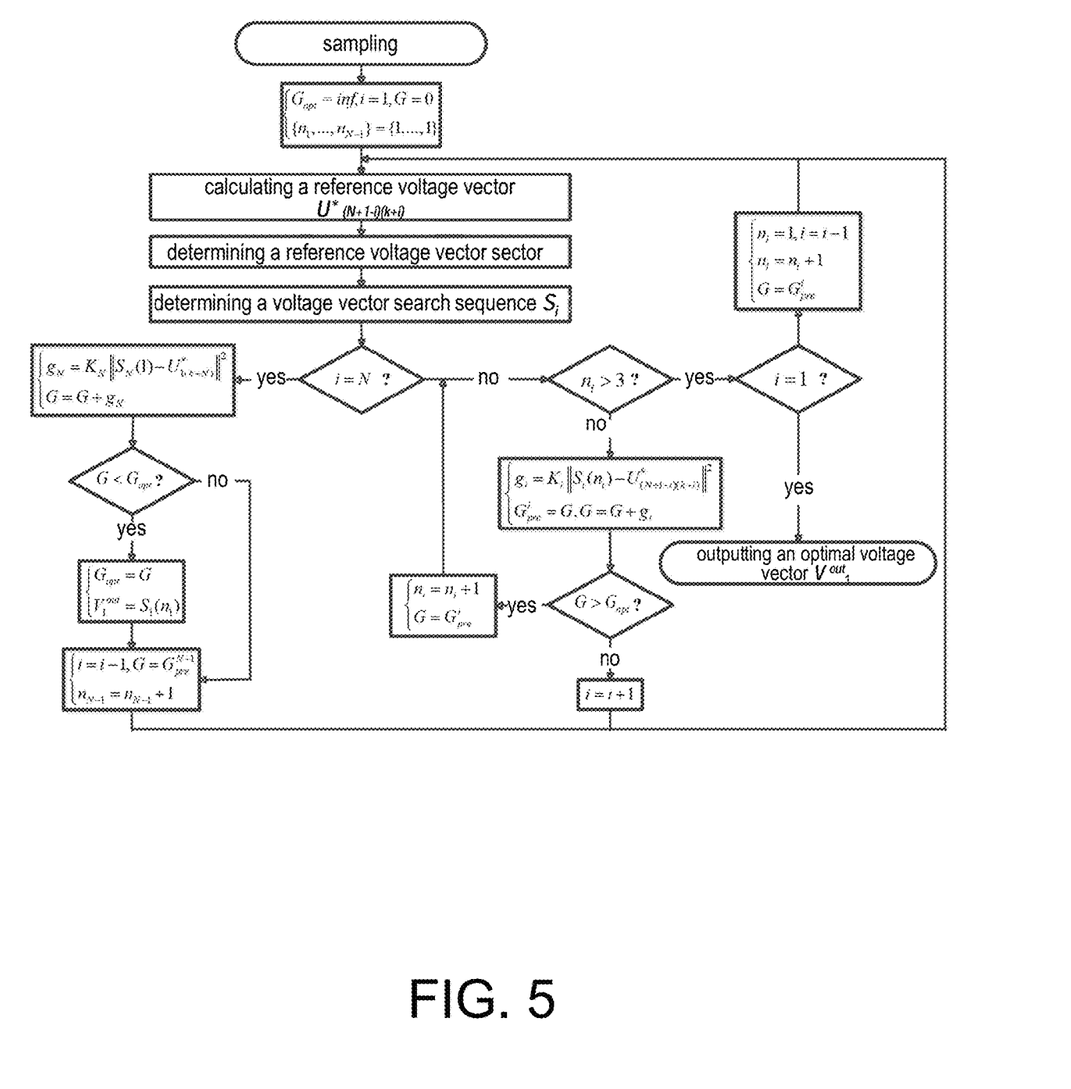
FIG. 5 is a flow chart of a control method provided by the disclosure.

IV. An execution flow chart of a final simplified algorithm is shown in FIG. 5, and the multistep finite control set model predictive control method for linear induction machines provided by the disclosure includes the following steps.

(1) At kth time step of present, a primary phase current $i_p^k$ of a linear induction machine in a three-phase coordinate system is collected and converted to an αβ coordinate system to obtain a current vector value $I_1^k$.

(2) A current vector value $I_1^{k+1}$ at (k+1)th time step is predicted according to the current vector value $I_1^k$ at the kth time step.

(3) A reference voltage vector $$U^*_{(N+1-i)(k+i)} = \frac{V^*_{k+i} + \lambda V_1^{k+i-1} + k_1 V_{k+i}^1 + \ldots + k_{N-i} V_{k+i}^{N-i}}{1 + \lambda + k_1 + \ldots + k_{N-i}}$$

at (k+i)th time step is calculated by iteration by treating the current vector value $I_1^{k+1}$ as an initial value. Predictive time i=1, L, N, and N is a total predictive step number, where $$V^*_{k+i} = \left(\frac{L_r^2 R_1 + R_2 L_m^2}{L_r^2} - \frac{L_r L_s - L_m^2}{L_r T_s}\right) I_1^{k+i} +$$

$$\frac{L_r L_s - L_m^2}{L_r T_s} I_1^* - \frac{R_2 L_m}{L_r^2} \psi_2 + j\frac{L_m}{L_r}\omega_2\psi_2, V_1^{k+i-1}$$

is a voltage vector selected at (k+i−1)th time step, $$V^h_{k+i} = \frac{K_{hI} I_1^{k+i} + K_{hG} G_{k+1} + K_{hL} L_\psi^{k+1}}{K_{hV}}, \quad h = 1, L, N-i,$$

λ is a weighting factor, $$k_1 = \frac{\lambda(1-B)^2}{1+\lambda}, \quad k_2 = \frac{k_1(1+\lambda)}{1+\lambda+k_i} K_{2V}^2,$$

$$k_h = \frac{k_{h-1}(1+\lambda+k_1+\ldots+k_{h-2})}{1+\lambda+k_i+\ldots+k_{h-1}} K_{hV}^2,$$

$$L_\psi^k = \frac{L_r T_s}{(L_r L_s - L_m^2)}\left(\frac{R_2 L_m}{L_r^2}\psi_2 - j\frac{L_m}{L_r}\omega_2\psi_2\right),$$

$$G_{k+1} = aL_\psi^{k-1} + bI_1^* + D_\psi^{k+1},$$

a and b are coefficients, $$a = \frac{L_r^2 R_1 + R_2 L_m^2}{L_r^2} - \frac{L_r L_s - L_m^2}{L_r T_s},$$

$$b = \frac{L_r L_s - L_m^2}{L_r T_s}, \text{ and } D_\psi^{k+1} = \frac{R_2 L_m}{L_r^2}\psi_2 + j\frac{L_m}{L_r}\omega_2\psi_2,$$

$T_s$ is a sampling period, $I^*_1$ is a reference current command, j represents an imaginary part, R represents resistance, ψ represents flux linkage of a machine, subscripts 1 and 2 respectively represent a primary variable and a secondary variable of the machine, $\omega_2$ represents a secondary angular velocity, $L_l$ represents leakage inductance of the machine; $L_r$ is secondary inductance, $L_s$ is primary inductance, and $L_m$ is mutual inductance.

Next, according to a preferred embodiment, in the disclosure, through the subsequent steps, the control method is simplified, and hardware costs required for execution of the method are reduced, so that the algorithm may be applied in an actual system.

(4) An inverter output voltage range is equally divided into six sectors designated as first to sixth sectors in a counterclockwise direction, the sectors to which reference voltage vectors at time $V_{k+1}$, L, $V_{k+N}$ belong are determined one by one, and a reference voltage vector angle of each sector is converted to a first sector.

(5) Filtering and sorting are performed to obtain an inverter candidate output voltage sequence $$S_n^{k+i} = \begin{cases} \{V_n, V_{n+1}, V_0\} & X > 0, Y > 0 \\ \{V_n, V_{n-1}, V_0\} & X > 0, Y < 0 \\ \{V_0, V_n, V_{n+1}\} & X < 0, Y > 0 \\ \{V_0, V_n, V_{n-1}\} & X < 0, Y < 0 \end{cases}$$

according to a reference voltage vector $\overline{U}^*_{(N+1-i)(k+i)}$ converted into the first sector, where $X = \text{Re}(\overline{U}^*_{(N+1-i)(k+i)}) - V_{dc}/3$, $Y = \text{IM}(U^*_{(N+1-i)(k+i)})$, $V_{dc}$ is a direct-current bus voltage, $V_0$ is a zero voltage vector outputted by an inverter, and $V_n$, $V_{n+1}$, $V_{n-1}$ are non-zero voltage vectors outputted by the inverter.

(6) An optimal voltage vector sequence is searched from the inverter candidate output voltage sequence $S_n^{k+i}$ by treating a minimum cost function value as a goal.

More specifically, the reference voltage vector angle of each sector is converted to the first sector through an angle conversion formula, and the angle conversion formula is:

$$T = \begin{bmatrix} \cos\left(\frac{(n-1)\pi}{3}\right) & \sin\left(\frac{(n-1)\pi}{3}\right) \\ -\sin\left(\frac{(n-1)\pi}{3}\right) & \cos\left(\frac{(n-1)\pi}{3}\right) \end{bmatrix},$$

where n is a serial number of the sector to which the reference voltage vector belongs.

More specifically, the cost function value is represented as:

$$J_N = \sum_{i=1}^{N} K_i \|S_n^{k+i} - U^*_{(N+1-i)(k+i)}\|^2,$$

where:

$$\begin{cases} K_1 = 1 + \lambda + k_1 + \ldots + k_{N-1} \\ \ldots \\ K_{N-1} = 1 + \lambda + k_1 \\ K_N = 1 + \lambda \end{cases},$$

and $U^*_{(N+1-i)(k+i)}$ represents the reference voltage vector at the (k+i)th time step.

In the disclosure, the multistep finite control set model predictive control method is applied to the linear induction machines to improve operating performance of the linear induction machines, especially in applications of low switching frequency. Further, the control method is simplified, and the hardware costs required for execution of the method are reduced, so that the method may be applied in an actual system.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A multistep finite control set model predictive control method for linear induction machines, comprising:

step 1 of collecting and converting a primary phase current $i_p^k$ of a linear induction machine in a three-phase coordinate system to an $\alpha\beta$ coordinate system to obtain a current vector value $I_1^k$ at kth time step of present;

step 2 of predicting a current vector value $I_1^{k+1}$ at (k+1)th time step according to the current vector value $I_1^k$ at the kth time step;

step 3 of calculating a reference voltage vector $$U^*_{(N+1-i)(k+i)} = \frac{V^*_{k+i} + \lambda V_1^{k+i-1} + k_1 V_{k+i}^1 + \ldots + k_{N-i} V_{k+i}^{N-i}}{1 + \lambda + k_1 + \ldots + k_{N-i}}$$

at the (k+i)th time step by iteration by treating the current vector value $I_1^{k+1}$ as an initial value, wherein predictive time i=1, L, and N, and N is a total predictive step number, wherein $$V^*_{k+i} = \left( \frac{L_r^2 R_1 + R_2 L_m^2}{L_r^2} - \frac{L_r L_s - L_m^2}{L_r T_s} \right) I_1^{k+i} + \frac{L_r L_s - L_m^2}{L_r T_s} I_1^* - \frac{R_2 L_m}{L_r^2} \psi_2 + j \frac{L_m}{L_r} \omega_2 \psi_2,$$

$V_1^{k+i-1}$ is a voltage vector selected at (k+i−1)th time step, $$V_{k+i}^h = \frac{K_{hI} I_1^{k+i} + K_{hG} G_{k+1} + K_{hL} L_\psi^{k+1}}{K_{hV}}, h = 1, L, N-i,$$

$\lambda$ is a weighting factor, $$k_1 = \frac{\lambda(1-B)^2}{1+\lambda}, k_2 = \frac{k_1(1+\lambda)}{1+\lambda+k_1} K_{2V}^2,$$

$$k_h = \frac{k_{h-1}(1+\lambda+k_1+\ldots+k_{h-2})}{1+\lambda+k_1+\ldots+k_{h-1}} K_{hV}^2,$$

$$L_\psi^k = \frac{L_r T_s}{(L_r L_s - L_m^2)} \left( \frac{R_2 L_m}{L_r^2} \psi_2 - j \frac{L_m}{L_r} \omega_2 \psi_2 \right),$$

$$G_{k+1} = aL_\psi^{k+1} + bI_1^* + D_\psi^{k+1},$$

a and b are coefficients, $$a = \frac{L_r^2 R_1 + R_2 L_m^2}{L_r^2} - \frac{L_r L_s - L_m^2}{L_r T_s},$$

$$b = \frac{L_r L_s - L_m^2}{L_r T_s}, \text{ and } D_\psi^{k+1} = \frac{R_2 L_m}{L_r^2} \psi_2 + j \frac{L_m}{L_r} \omega_2 \psi_2;$$

$T_s$ is a sampling period, $I_1^*$ is a reference current command, j represents an imaginary part, R represents resistance, $\psi$ represents flux linkage of linear induction machine, subscripts 1 and 2 respectively represent a primary variable and a secondary variable of the linear induction machine, $\omega_2$ represents a secondary angular velocity, $L_l$ represents leakage inductance of the linear induction machine; $L_r$ is secondary inductance, $L_s$ is primary inductance, and $L_m$, is mutual inductance, wherein the multistep finite control set model predictive control method further comprises: outputting the reference voltage vector to control the linear induction machine by generating a linear motion.

2. The multistep finite control set model predictive control method for linear induction machines according to claim 1, further comprising:

step 4 of equally dividing output voltage range of an inverter into six sectors designated as first to sixth sectors in a counterclockwise direction, determining the sectors to which reference voltage vectors at time $V_{k+1}$, L, $V_{k+N}$ belong one by one, and converting a reference voltage angle of each sector to a first sector;

step 5 of performing filtering and sorting to obtain an inverter candidate output voltage sequence $$S_n^{k+i} = \begin{cases} \{V_n, V_{n+1}, V_0\} & X>0, Y>0 \\ \{V_n, V_{n-1}, V_0\} & X>0, Y<0 \\ \{V_0, V_n, V_{n+1}\} & X<0, Y>0 \\ \{V_0, V_n, V_{n-1}\} & X<0, Y<0 \end{cases}$$

according to a reference voltage vector $\overline{U}^*_{(N+1-i)(k+i)}$ converted into the first sector, wherein $X = \text{Re}(\overline{U}^*_{(N+1-i)(k+i)}) - V_{dc}/3$, $Y = \text{Im}(\overline{U}^*_{(N+1-i)(k+i)})$, $V_{dc}$ is a direct-current bus voltage, $V_o$ is a zero voltage vector outputted by the inverter, and $V_n$, $V_{n+1}$, $V_{n-1}$ are non-zero voltage vectors outputted by the inverter;

step 6 of searching for an optimal voltage vector sequence from the inverter candidate output voltage sequence $S_n^{k+i}$ by treating minimizing a cost function value as a goal.

3. The multistep finite control set model predictive control method for linear induction machines according to claim 2, wherein the reference voltage vector angle of each sector is converted to the first sector through an angle conversion formula, and the angle conversion formula is:

$$T = \begin{bmatrix} \cos\left(\frac{(n-1)\pi}{3}\right) & \sin\left(\frac{(n-1)\pi}{3}\right) \\ -\sin\left(\frac{(n-1)\pi}{3}\right) & \cos\left(\frac{(n-1)\pi}{3}\right) \end{bmatrix}$$

wherein n is a serial number of the sector to which the reference voltage vector belongs.

4. The multistep finite control set model predictive control method for linear induction machines according to claim 2, wherein the cost function value is represented as:

$$J_N = \sum_{i=1}^{N} K_i \|S_n^{k+i} - U^*_{(N+1-i)(k+1)}\|^2,$$

wherein:

$$\begin{cases} K_1 = 1 + \lambda + k_1 + \ldots + k_{N-1} \\ \ldots \\ K_{N-1} = 1 + \lambda + k_1 \\ K_N = 1 + \lambda \end{cases}$$

and $U^*_{(N+1-i)(k+i)}$ represents the reference voltage vector at the (k+i)th time step.

5. The multistep finite control set model predictive control method for linear induction machines according to claim 1, wherein the reference voltage vector angle of each sector is converted to the first sector through an angle conversion formula, and the angle conversion formula is:

$$T = \begin{bmatrix} \cos\left(\frac{(n-1)\pi}{3}\right) & \sin\left(\frac{(n-1)\pi}{3}\right) \\ -\sin\left(\frac{(n-1)\pi}{3}\right) & \cos\left(\frac{(n-1)\pi}{3}\right) \end{bmatrix}$$

wherein n is a serial number of the sector to which the reference voltage vector belongs.

6. The multistep finite control set model predictive control method for linear induction machines according to claim 1, wherein the cost function value is represented as:

$$J_N = \sum_{i=1}^{N} K_i \|S_n^{k+i} - U^*_{(N+1-i)(k+i)}\|^2,$$

wherein:

$$\begin{cases} K_1 = 1 + \lambda + k_1 + \ldots + k_{N-1} \\ \ldots \\ K_{N-1} = 1 + \lambda + k_1 \\ K_N = 1 + \lambda \end{cases}$$

and $U^*_{(N+1-i)(k+i)}$ represents the reference voltage vector at the (k+i)th time step.

7. A multistep finite control set model predictive control system for linear induction machines, comprising following modules:

a sampling module, configured to collect and convert a primary phase current $i_p^k$ of a linear induction machine in a three-phase coordinate system to an αβ coordinate system to obtain a current vector value $I_1^k$ at kth time step of present;

a current conversion module, configured to predict a current vector value $I_1^{k+1}$ at (k+1)th time step according to the current vector value $I_1^k$ at the kth time step; and a reference voltage vector prediction module, configured to calculate a reference voltage vector $$U^*_{(N+1-i)(k+i)} = \frac{V^*_{k+i} + \lambda V_1^{k+i-1} + k_1 V_{k+i}^1 + \ldots + k_{N-1} V_{k+i}^{N-i}}{1 + \lambda + k_1 + \ldots + k_{N-i}}$$

at the (k+i)th time step by iteration by treating the current vector value $I_1^{k+1}$ as an initial value, wherein predictive time i=1, L, N, and N is a total predictive step number, wherein $$V^*_{k+i} = \left(\frac{L_r^2 R_1 + R_2 L_m^2}{L_r^2} - \frac{L_r L_s - L_m^2}{L_r T_s}\right) I_1^{k+i} +$$

$$\frac{L_r L_s - L_m^2}{L_r T_s} I_1^* - \frac{R_2 L_m}{L_r^2} \psi_2 + j\frac{L_m}{L_r}\omega_2\psi_2, V_1^{k+i-1}$$

is a voltage vector selected at (k+i−1)th time step, $$V_{k+i}^h = \frac{K_{h1}I_1^{k+i} + K_{hG}G_{k+1} + K_{hL}L_\psi^{k+1}}{K_{hV}}, h = 1, L, N - i,$$

λ is a weighting factor, $$k_1 = \frac{\lambda(1-B)^2}{1+\lambda},$$
$$k_2 = \frac{k_1(1+\lambda)}{1+\lambda+k_1}K_{2V}^2,$$
$$k_h = \frac{k_{h-1}(1+\lambda+k_1+\ldots+k_{h-2})}{1+\lambda+k_1+\ldots+k_{h-1}}K_{hV}^2,$$
$$L_\psi^k = \frac{L_r T_s}{(L_r L_s - L_m^2)}\left(\frac{R_2 L_m}{L_r^2}\psi_2 - j\frac{L_m}{L_r}\omega_2\psi_2\right),$$
$$G_{k+1} = aL_\psi^{k+1} + bI_1^* + D_\psi^{k+1},$$

a and b are coefficients, $$a = \frac{L_r^2 R_1 + R_2 L_m^2}{L_r^2} - \frac{L_r L_s - L_m^2}{L_r T_s}, b\frac{L_r L_s - L_m^2}{L_r T_s}, \text{ and}$$

$$D_\psi^{k+1} = \frac{R_2 L_m}{L_r^2}\psi_2 + j\frac{L_m}{L_r}\omega_2\psi_2,$$

wherein $T_s$ is a sampling period, $I^*_1$ is a reference current command, j represents an imaginary part, R represents resistance, ψ represents flux linkage of linear induction machine, subscripts 1 and 2 respectively represent a primary variable and a secondary variable of the linear induction machine, $\omega_2$ represents a secondary angular velocity, $L_l$ represents leakage inductance of the linear induction machine; $L_r$ is secondary inductance, $L_s$ is primary inductance, and $L_m$ is mutual inductance wherein the multistep finite control set model predictive control method further comprises: outputting the reference voltage vector to control the linear induction machine by generating a linear motion.

8. The multistep finite control set model predictive control system for linear induction machines according to claim 7, further comprising following modules:

a sector processing module, configured to equally divide output voltage range of an inverter into six sectors designated as first to sixth sectors in a counterclockwise direction, determine the sectors to which reference voltage vectors at time $V_{k+1}$, L, $V_{k+N}$ belong one by one, and convert a reference voltage vector angle of each sector to a first sector;

a filtering and sorting module, configured to perform filtering and sorting to obtain an inverter candidate output voltage sequence $$S_n^{k+i} = \begin{cases} \{V_n, V_{n+1}, V_0\} & X > 0, Y > 0 \\ \{V_n, V_{n-1}, V_0\} & X > 0, Y < 0 \\ \{V_0, V_n, V_{n+1}\} & X < 0, Y > 0 \\ \{V_0, V_n, V_{n-1}\} & X < 0, Y < 0 \end{cases}$$

according to a reference voltage vector $\overline{U}^*_{(N+1-i)(k+i)}$ converted into the first sector, wherein X=Re $(\overline{U}^*_{(N+1-i)(k+i)})-V_{dc}/3$, Y=Im $(\overline{U}^*_{(N+1-i)(k+i)})$, $V_{dc}$ is a direct-current bus voltage, $V_0$ is a zero voltage vector outputted by the inverter, and $V_n$, $V_{n+1}$, $V_{n-1}$ are non-zero voltage vectors outputted by the inverter; and an optimization searching module, configured to search for an optimal voltage vector sequence from the inverter candidate output voltage sequence $S^{k+i}_n$ by treating minimizing a cost function value as a goal.

9. The multistep finite control set model predictive control system for linear induction machines according to claim 8, wherein the sector processing module converts the reference voltage vector angle of each sector to the first sector through an angle conversion formula, and the angle conversion formula is:

$$T = \begin{bmatrix} \cos\left(\frac{(n-1)\pi}{3}\right) & \sin\left(\frac{(n-1)\pi}{3}\right) \\ -\sin\left(\frac{(n-1)\pi}{3}\right) & \cos\left(\frac{(n-1)\pi}{3}\right) \end{bmatrix}$$

wherein n is a serial number of the sector to which the reference voltage vector belongs.

10. The multistep finite control set model predictive control system for linear induction machines according to claim 8, wherein the cost function value in the optimization searching module is represented as:

$$J_N = \sum_{i=1}^{N} K_i \|S_n^{k+i} - U^*_{(N+1-i)(k+i)}\|^2,$$

wherein:

$$\begin{cases} K_1 = 1 + \lambda + k_1 + \ldots + k_{N-1} \\ \ldots \\ K_{N-1} = 1 + \lambda + k_1 \\ K_N = 1 + \lambda \end{cases}.$$

11. The multistep finite control set model predictive control system for linear induction machines according to claim 7, wherein the sector processing module converts the reference voltage vector angle of each sector to the first sector through an angle conversion formula, and the angle conversion formula is:

$$T = \begin{bmatrix} \cos\left(\frac{(n-1)\pi}{3}\right) & \sin\left(\frac{(n-1)\pi}{3}\right) \\ -\sin\left(\frac{(n-1)\pi}{3}\right) & \cos\left(\frac{(n-1)\pi}{3}\right) \end{bmatrix}$$

wherein n is a serial number of the sector to which the reference voltage vector belongs.

12. The multistep finite control set model predictive control system for linear induction machines according to claim 7, wherein the cost function value in the optimization searching module is represented as:

$$J_N = \sum_{i=1}^{N} K_i \|S_n^{k+i} - U^*_{(N+1-i)(k+1)}\|^2,$$

wherein:

$$\begin{cases} K_1 = 1 + \lambda + k_1 + \ldots + k_{N-1} \\ \ldots \\ K_{N-1} = 1 + \lambda + k_1 \\ K_N = 1 + \lambda \end{cases}.$$

\* \* \* \* \*